Oct. 27, 1953 R. B. BUCHNER 2,657,270
LINE CIRCUIT WITHOUT RELAYS
Filed June 17, 1949
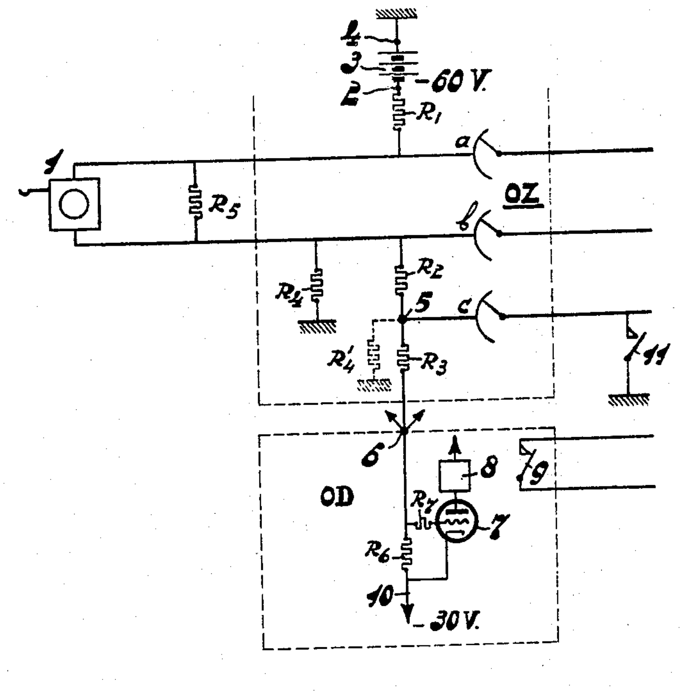
INVENTOR
ROBERT BERTOLD BUCHNER
BY [signature]
AGENT Patented Oct. 27, 1953 2,657,270

UNITED STATES PATENT OFFICE 2,657,270

LINE CIRCUIT WITHOUT RELAYS

Robert Bertold Buchner, Eindhoven, Netherlands, assignor to Hartford National Bank and Trust Company, Hartford, Conn., as trustee Application June 17, 1949, Serial No. 99,793
In the Netherlands July 2, 1948

6 Claims. (Cl. 179—18)

The invention relates to a subscriber's circuit in automatic signal systems, for example an automatic telephone system, in which each subscriber's line is individually equipped with a number of resistances of high value, the first of which is connected between a battery terminal and one of the intelligence lines, a second being connected between the second intelligence line and the associated test conductor, the latter being connected to the second battery terminal, if the subscriber is busy, the said test conductor being connected through a third resistance to a point common to a number of subscriber's lines, to which a device responsive to calls is connected.

In a well-known circuit-arrangement of this kind a fourth resistance is connected between the test conductor and the second battery terminal, whereas the third resistance is designed so that in one direction of current flow, it exhibits a resistance which is low compared with that of the other individual resistances, whereas for the other direction of current flow it exhibits a resistance which is very high compared with that of the other resistances.

It has further been suggested for the resistance connected between the test conductor and the point common to a number of subscriber's lines to be such that its value varies exponentially with applied voltage.

In these circuit-arrangements the test conductor exhibits a potential diverging from that of other test conductors, during establishment of a call upon closure of the subscriber's loop through the subscriber's telephone whilst, at the same time, the potential of the common point is varied so that the device responsive to calls is operated and so that one or more call finders are actuated and find the marked subscriber's line. Upon the occurrence of leakage currents between the conductors of a subscriber's line or between these conductors and earth, the battery voltage is distributed between the resistance constituted by the leakage path and the individual resistances, so that, provided the leakage currents are not excessive, the associated test conductor and the point common to a number of subscriber's lines are prevented from assuming potentials such that a call finder may be stopped on an output line of a non-calling subscriber and/or the device responsive to calls from being operated at the wrong time.

A circuit-arrangement according to the invention is characterized in that a fourth resistance is connected between the second conductor and the second battery terminal.

This measure ensures an effective voltage distribution between the line leakage resistance and the individual resistances, so that the circuit-arrangement according to the invention has the advantage over the first mentioned arrangements that, other conditions being equal, such as identical load formed by the resistances on the subscriber's line and identical voltage across the test conductor in call-condition, a line leakage resistance of only half that of the known arrangement is permissible before the potential of the test conductor and of the common point in the non-calling condition exceeds a given tolerance.

In order that the invention may be more clearly understood and readily carried into effect, one form will now be described more fully by way of example with reference to the accompanying drawing, which is a schematic circuit diagram.

In the accompanying drawing, a subscriber's station 1 is connected, through two intelligence lines *a* and *b*, to one of the outlets of a call finder switch OZ.

The intelligence line *a* is connected through a resistance $R_1$ to the negative terminal 2 of a battery 3 having a voltage of −60 v., the positive terminal of which is connected to earth potential. The intelligence line *b* is connected through resistance $R_2$ to the test conductor C and through resistance $R_4$ to the positive terminal of the battery (earth). Any leakage occurring between the intelligence lines is denoted by resistance $R_5$. A resistance $R_3$ is connected between the test conductor C and a point 6 common to a number of subscriber's lines of the same group, to which a device OD responsive to calls is connected. This resistance may be constituted, as in the known circuit-arrangement, by a rectifying element or, by a resistance, whose value varies exponentially with the applied voltage such as the material known under the registered trade-mark "Atmite."

The device OD comprises a discharge tube 7, the control-grid of which is connected through a grid-current limiting resistance $R_7$ to the common point 6. The cathode is connected to a point 10 having a potential of −30 v. Connected between the point 6 and the cathode of the tube 7 is a leakage resistance $R_6$. The anode circuit includes the winding of a relay 8.

The circuit-arrangement operates as follows. So long as no calls are established in the subscriber's group concerned, point 6 has a potential with respect to the cathode of tube 7 such that this tube is conducting and relay 8 is energized, so that the back contact 9 of this relay is opened.

When subscriber 1 takes off the receiver, a circuit is closed from the negative terminal 2 of the battery through the resistance $R_1$, the subscriber's loop across the subscriber's station and the resistance $R_4$ to earth. The conductor $a$ thus has a negative potential which is equal to $$-\frac{R_4}{R_1+R_4}\times E$$

where E is the battery voltage. Since resistance $R_6$ has a very high value, points 5 and 6 assume approximately the same potential. The ratio between resistances $R_1$ and $R_4$ is such that the potential of the control-grid of tube 7 becomes negative relatively to the cathode, so that the tube is cut off and relay 8 is de-energized. Owing to the closure of back contact 9, one or more free call finders are actuated to find the subscriber. As soon as the subscriber's $c$-contact characterized by the negative potential, has been found by one of the call finders, this call finder is stopped by a control-device (not shown) and the output is rendered engaged by connecting the $c$-wiper through contact 11 and, if desired, through a resistance, to the positive terminal of the battery (earth). At the same time, the potential of point 6 is thus raised to such a value that tube 7 becomes conducting, provided that no other call is available.

During conversation the $b$-conductor is connected to earth potential through the parallel combination of resistances $R_2$ and $R_4$. The subscriber's line will consequently be loaded symmetrically, if the resulting resistance of the parallel combination of $R_2$ and $R_4$ is equal to $R_1$.

As said before, the effective resistance of the line leakage between conductors $a$ and $b$ must not drop below a given value, in order that in the non-calling condition the test conductor may be prevented from assuming a potential such that a call finder would stop at the line concerned or the device responsive to calls would become operative.

In order that the circuit-arrangement may be compared with known arrangements in which the test conductor and one of the battery terminals have a resistance connected between them, the figure shows in a resistance $R_4^1$ in dotted lines. In the known circuit-arrangements resistance $R_4$ is absent and resistances $R_1$ and $R_2$ are identical. In the known system, during a call the potential of the test conductor will be equal to $$-\frac{R_4^1}{2R_1+R_4^1}\times E$$

and will thus be equal to the potential of point 5 of the circuit-arrangement here shown, if $R_4^1$ is equal to $2R_4$. In the circuit-arrangement according to the invention if the subscriber is free, the potential of point 5 will be equal to $$-\frac{R_4}{R_1+R_5+R_4}\times E$$

whereas in the known system it will be equal to $$-\frac{R_4^1}{2R_1+R_5^1+R_4^1}$$

if the permissible line leakage resistances of these systems are assumed to be equal to $R_5$ and $R_5^1$ respectively. The voltages across the test conductor will consequently be identical in the two systems, if $R_5^1=2R_5$. In the circuit-arrangement according to the invention, half the value of leakage resistance is thus permissible between the intelligence lines, before the correct operation of the system is upset.

A leakage between the conductors is generally accompanied by leakage from the conductors to earth. In this connection it is particularly advantageous to earth the battery terminal which is connected to resistance $R_4$, as shown in the example, in contradistinction to known circuit-arrangements in which the terminal connected to resistance $R_1$ is earthed.

In the circuit-arrangement shown, an earth leakage from one or from both the conductors operates in opposite sense to the leakage between the conductors. Without leakage between the conductors, points 5 and 6 are at earth potential, independently of the value of the leakage from the conductors to earth. The leakage of the intelligence line $b$ here constitutes a resistance in parallel with resistance $R_4$. When there is leakage between the conductors, points 5 and 6 have a negative potential and the smaller the resistance by which the leakage of conductors $a$ and $b$ to earth is represented, that is, the greater the earth leakage, the lower is the said negative potential.

The permissible line leakage resistance and the earth leakage resistance may be further reduced if resistance $R_1$ is such that its resistance decreases when the applied voltage increases. The resistance $R_1$ may consequently be constituted with advantage by a resistance of negative temperature coefficient or it may be made of a material known under the registered trademark "Thyrite" or "Atmite" it being necessary for the resistances to be such that under intelligence conditions the resistance between the terminal 2 of the battery and the intelligence line $a$ is equal to the resulting resistance of the parallel combination of $R_2$ and $R_4$.

What I claim is:

1. In an automatic telephone system, at least one call finder switch associated with a group of subscribers and provided with first and second multi-contact line sections and a multi-contact test section, first and second intelligence-signal lines connecting each subscriber to corresponding contacts in said first and second sections, a direct-voltage source, a first resistance connecting said first line to one end of said source, a second resistance connecting said second line to a corresponding contact in said test section, a third resistance connecting said test switch contact to a point common to a number of subscriber lines in said group, a call-responsive device coupled to said point for actuating said call finder when a call is received, means responsive when said subscriber is engaged by a call finder to connect said test switch contact to the other end of said source, and a fourth resistance connected between said second line and said other end of said source to ensure an effective voltage distribution between the first, second and third resistances and a resistance constituted by a line leakage path.

2. A system, as set forth in claim 1, wherein said first resistance has a value substantially equal to the value resulting in the case of a parallel connection of said second and fourth resistances.

3. A system, as set forth in claim 1, wherein said first resistance has a characteristic at which its resistance value decreases when the voltage applied thereto increases.

4. An arrangement, as set forth in claim 1, wherein said first resistance has a negative temperature characteristic and wherein said other end of said source is grounded.

5. An arrangement as set forth in claim 1 wherein said third resistance is constituted by a rectifier.

6. An arrangement as set forth in claim 1 wherein said third resistance is constituted by a resistance whose value varies exponentially in accordance with an applied voltage.

ROBERT BERTOLD BUCHNER.

References Cited in the file of this patent

UNITED STATES PATENTS

| Number | Name | Date |
|---|---|---|
| 1,723,524 | Rosa | Aug. 6, 1929 |
| 1,914,391 | Wolf | June 20, 1933 |
| 2,152,889 | Jedrychowski | Apr. 4, 1939 |
| 2,574,224 | Obermann | Nov. 6, 1951 |